Jan. 29, 1924.　　　　　　　　　　　　　　　　　　1,482,127
R. B. GLICK
DEVICE FOR PLACING CORK INSERTS IN CLUTCH PLATES
Filed Oct. 9, 1922　　　　2 Sheets-Sheet 1

Inventor
R. B. GLICK

Jan. 29, 1924.

R. B. GLICK 1,482,127

DEVICE FOR PLACING CORK INSERTS IN CLUTCH PLATES

Filed Oct. 9, 1922   2 Sheets-Sheet 2

Inventor
R. B. GLICK

By
Attorney

Patented Jan. 29, 1924.

1,482,127

UNITED STATES PATENT OFFICE.

RALPH B. GLICK, OF RIVERSIDE, CALIFORNIA.

DEVICE FOR PLACING CORK INSERTS IN CLUTCH PLATES.

Application filed October 9, 1922. Serial No. 593,483.

*To all whom it may concern:*

Be it known that I, RALPH B. GLICK, a citizen of the United States, residing at Riverside, in the county of Riverside and State of California, have invented certain new and useful Improvements in Devices for Placing Cork Inserts in Clutch Plates, of which the following is a specification.

This invention relates to devices for placing cork inserts in clutch plates, and it comprises a support adapted to receive the clutch plate, a tube through which the cork insert is forced, and means for forcing the insert through said tube.

An object of the invention is the provision of mechanical means for repairing clutch plates used on various types of motor vehicles to reduce the time now required in repairing such plates by hand.

In the present invention, I provide a support adapted to receive the clutch plate and having an opening arranged in alinement with the opening in the plate in which the insert is to be placed. An arm is pivotally connected to the support and extends forwardly therefrom. A guide tube is mounted upon a suitable supporting arm secured to the first arm and a plunger is mounted on the second arm arranged substantially parallel to the tube supporting arm.

In the accompanying drawings, I have shown one embodiment of the invention. In this showing:

Figure 1:
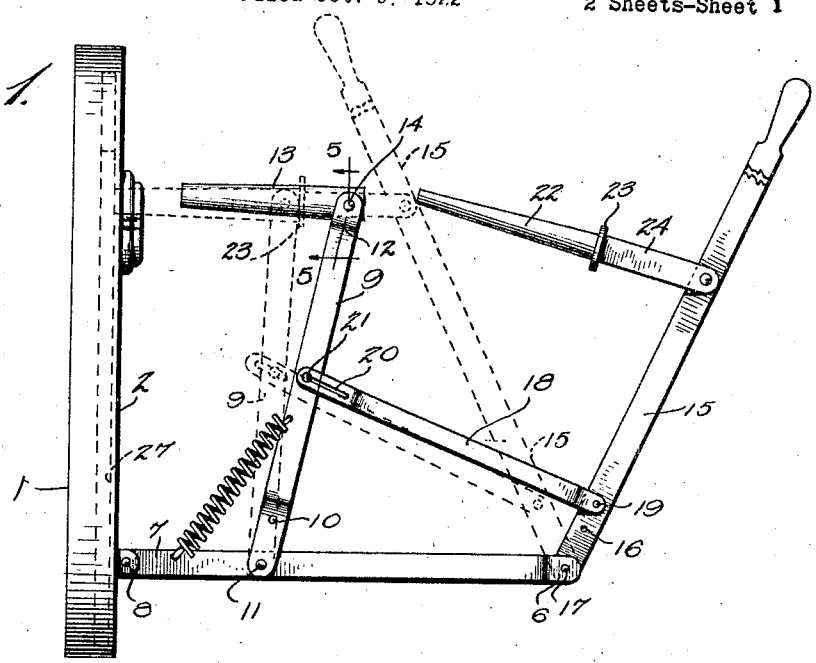
Figure 1 is a side elevation.

Referring to the drawings, the reference numeral 1 designates a base or support which may be made in the form of a circular plate or disk. This plate is provided with a lip or flange 2, arranged at its periphery and extending partially around the same. An extension 3 is secured to the upper end of the flange at a desired point and extends over the supporting plate substantially parallel thereto. Diametrically opposite the extension 3, there is provided a similar extension 4 and this extension is provided with openings 5. The inner end of the lower extension is provided with ears 6, adapted to receive a supporting arm 7. This arm is pivotally supported between the ears by a pin 8. A tube supporting member 9 is pivoted to the arm 7, intermediate its ends. As shown, the tube supporting member is provided with a plurality of openings 10, whereby the position of the tube with respect to the supporting plate may be adjusted. A pivot pin 11 is adapted to pass through one of these openings and through a similar opening in the supporting arm. The yoke 12 is formed on the upper end of the tube supporting arm and this yoke is adapted to receive a guide tube 13. The guide tube is secured in the yoke by means of pins 14.

Arranged outwardly of the tube supporting arm is a handle 15, which is adapted to be secured to the arm 7. As shown, the handle is provided with a plurality of openings 16 adapted to receive a pivot pin 17 which passes through an opening in the arm 7. The tube supporting arm and handle are connected to each other by a link 18, which is pivotally connected to the handle 19. The inner end of this link is provided with a slot 20, adapted to receive a pin 21, carried by the tube supporting arm. A plunger 22 is pivotally mounted on the handle. As shown, the plunger comprises a tapering body portion adapted to be received within the tube having a collar 23 formed at its outer end. Beyond the collar, there is provided a flattened portion 24, having a yoke 25 formed on its outer end adapted to embrace the handle. This yoke is provided with openings adapted to aline with the opening in the handle for the reception of a pivot pin 26.

Figure 2:
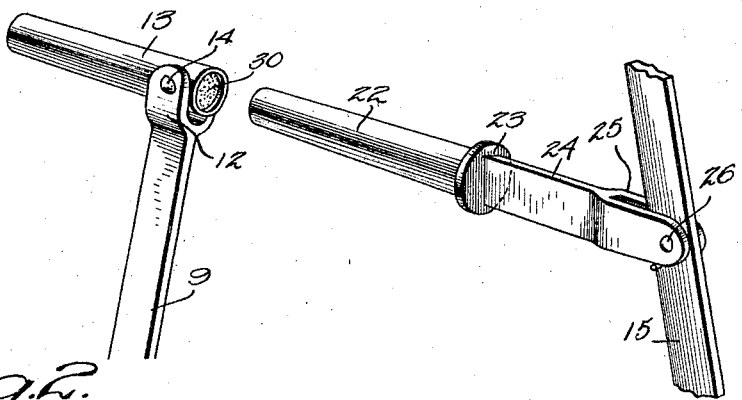
Figure 2 is a detail view of the guide tube and plunger.
Figure 3:
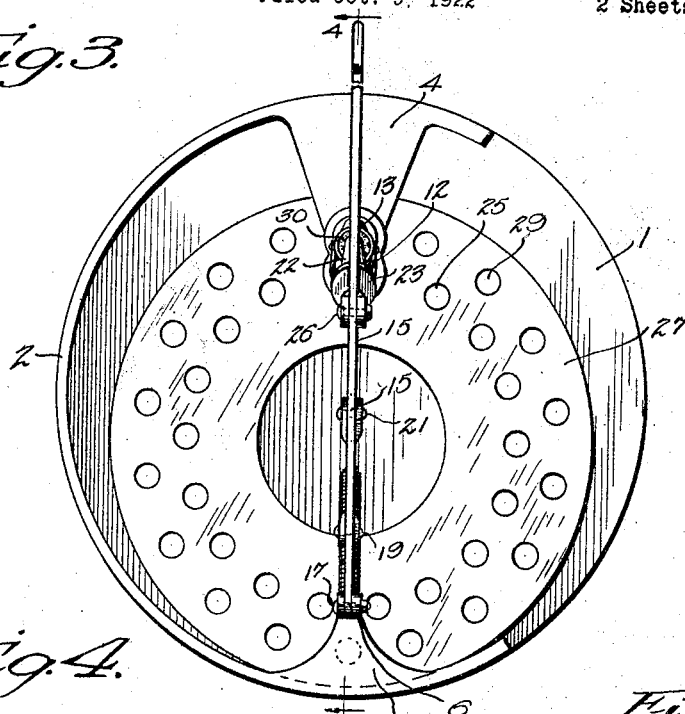
Figure 3 is a front elevation.
Figure 4:
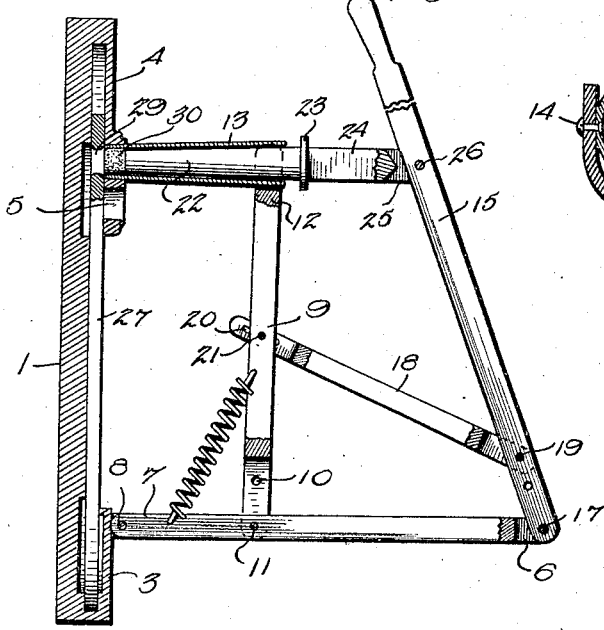
Figure 4 is a vertical sectional view on line 4—4 of Figure 3.
Figure 5:
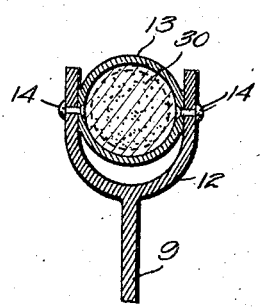
Figure 5 is a detail sectional view on line 5—5 of Figure 1.

The operation of the device will be apparent from the foregoing description. A clutch plate 27 of the type employed in various makes of automobiles is shown in Figure 3 of the drawings. This plate is provided with two concentric series of openings 28 and 29, adapted to receive cork inserts 30. When the inserts are to be placed in the plate, the plate is arranged in the support by inserting it from the right hand side in Figure 1 of the drawings. The size of the supporting plate is such that the inner row of concentric openings is arranged in the circle with the inner opening 5, and the outer row is arranged in the circle with the outer opening. By revolving the plate, any desired opening in the plate may be brought into alinement with one of the openings in the extension 4. The cork insert is placed in the outer end of the guide tube, as shown in Figures 2 and 3 of the drawings, and the plunger moved inwardly to the dotted line position shown in Figure 1 of the drawings, forcing the insert through the opening 5 into the opening in the clutch plate. In the drawings, I have shown the pivot pins 11 and 17 arranged in the outer openings of the supporting arm 9 and handle 15, respectively. This adjustment is for the purpose of placing inserts in the outer row of openings 29 of the clutch plate. When the inserts are to be placed in the inner row 28, the arm and handle are adjusted to aline with the inner opening 5 by placing the pivot pins in the inner openings 10 and 16 of the arms.

By means of this device, the inserts may be quickly placed in position and may then be filed or cut off in a very few minutes. This eliminates a great deal of hand work now required in repairing clutch plates and permits the operation to be performed in a very much smaller period of time.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. In a device of the character described, a supporting member comprising a circular plate having a peripheral flange extending partially around it, diametrically opposed extensions formed on said flange and arranged over said plate to permit a clutch plate to be arranged between said plate and said extensions, one of said extensions being provided with an opening adapted to aline with openings in the clutch plate, an arm pivotally mounted on the other extension, a tube support pivotally connected to said arm intermediate its ends, a tube carried by said support, a handle pivotally mounted on said arm, and a plunger carried by said handle and adapted to enter said tube to feed inserts through said opening in said extension into the openings in said clutch plate.

2. In a device of the character described, a supporting member comprising a circular base portion having a peripheral flange extending partially around it, a pair of diametrically opposed extensions carried by said flange and arranged over said base portion whereby a clutch plate may be received between said base portion and said extensions, one of said extensions being provided with a plurality of openings arranged at different distances from the edge and adapted to aline with openings arranged at different distances from the center of a clutch plate, an arm pivotally mounted on the other extension, a tube support pivoted to said arm intermediate its ends, a tube carried by said support, a handle pivoted to said arm, a plunger carried by said handle and adapted to enter said tube, and means for adjusting said tube support and said handle whereby said tube and said plunger may be arranged in alinement with either of the openings in said extension.

3. In a device of the character described, a supporting member, said supporting member being provided with an opening adapted to aline with an opening in the clutch plate, a supporting arm secured to said member and extending outwardly therefrom, a tube support secured to said arm, a tube carried by said tube support in alinement with said opening, a handle pivoted to said arm, and a plunger carried by said handle and adapted to be received in said tube.

4. In a device of the character described, a supporting member adapted to receive a clutch plate, said supporting member being provided with a plurality of openings arranged at different distances from the edge of said supporting member and adapted to aline with openings arranged at different distances from the center of the clutch plate, a supporting arm secured to said member and extending outwardly therefrom, a tube support pivotally connected to said arm, a handle pivotally connected to said arm, said tube support and said handle being each provided with a plurality of openings to permit adjustment, a tube carried by said tube support, and a plunger carried by said handle, said tube and said plunger being adapted to aline with different openings in the supporting member when the handle and tube support are adjusted to different positions.

5. In a device of the character described, a supporting member comprising a base having a peripheral flange extending partially around it, a pair of oppositely disposed extensions secured to said flange and arranged over said base, one of said extensions being provided with a plurality of openings, each of which openings is adapted to be arranged in alinement with any one of a series of concentric openings in a clutch plate by rotating said plate on said base, a guide tube to feed insert members to said openings, means for adjusting said guide tube to aline it with either of said openings, and a plunger mounted in said guide tube to force an insert member from said tube through the opening.

In testimony whereof, I affix my signature in presence of two witnesses.

RALPH B. GLICK

Witnesses:
 OLIVE M. GOULD,
 BESSIE L. PETERS.